United States Patent [19]

Lee et al.

[11] Patent Number: 4,481,020

[45] Date of Patent: Nov. 6, 1984

[54] LIQUID-GAS SEPARATOR APPARATUS

[75] Inventors: Lawrence C. Lee; Mukul K. Tyagi; Michael W. Furnas; Francis T. Traylor, all of Bartlesville, Okla.

[73] Assignee: TRW Inc., Cleveland, Ohio

[21] Appl. No.: 386,968

[22] Filed: Jun. 10, 1982

Related U.S. Application Data

[63] i.

[51] Int. Cl.³ ............................................. B01D 45/00
[52] U.S. Cl. ...................................... 55/203; 55/406; 166/105.5; 415/73
[58] Field of Search ............... 55/203, 406; 166/105.5; 415/71–75

[56] References Cited

U.S. PATENT DOCUMENTS

| 1,005,204 | 10/1911 | Harper, Jr. ............................ 415/74 |
| 1,816,971 | 8/1931 | Hoff et al. ............................ 415/75 |
| 1,832,445 | 11/1931 | Birmann . |
| 2,285,169 | 6/1942 | Pyle . |
| 2,311,963 | 2/1943 | Pyle . |
| 2,511,150 | 6/1950 | Edwards ................................ 103/5 |
| 2,761,393 | 9/1956 | Di Stefano et al. .................. 103/88 |
| 2,811,110 | 10/1957 | Edwards ............................. 103/113 |
| 2,887,959 | 5/1959 | Stefano . |
| 2,969,742 | 1/1961 | Arutunoff . |
| 3,282,031 | 11/1966 | Vos et al. . |
| 3,299,821 | 1/1967 | Silvern ................................ 415/72 |
| 3,300,950 | 1/1967 | Carle . |
| 3,624,822 | 11/1971 | Carle et al. . |
| 3,887,342 | 6/1975 | Bunnelle . |
| 4,088,459 | 5/1978 | Tuzson . |
| 4,231,767 | 11/1980 | Acker . |

Primary Examiner—Bernard Nozick
Attorney, Agent, or Firm—Shapiro and Shapiro

[57] ABSTRACT

A centrifugal liquid-gas separator apparatus which is particularly adapted for use downhole with a submergible pump comprises an elongated hub having disposed on its periphery helical blades defining a screw-type inducer for pressurizing a liquid-gas fluid mixture entering the apparatus, axially extending vanes defining a centrifugal separator for separating the liquid and gas components of the fluid mixture, and smoothly curved blade segments disposed intermediate the blades and the vanes for providing a smooth transition for the fluid mixture flowing from the inducer to the centrifugal separator. The apparatus is capable of maintaining a substantially constant flow rate over a large range of volumetric ratios of gas to liquid.

39 Claims, 10 Drawing Figures

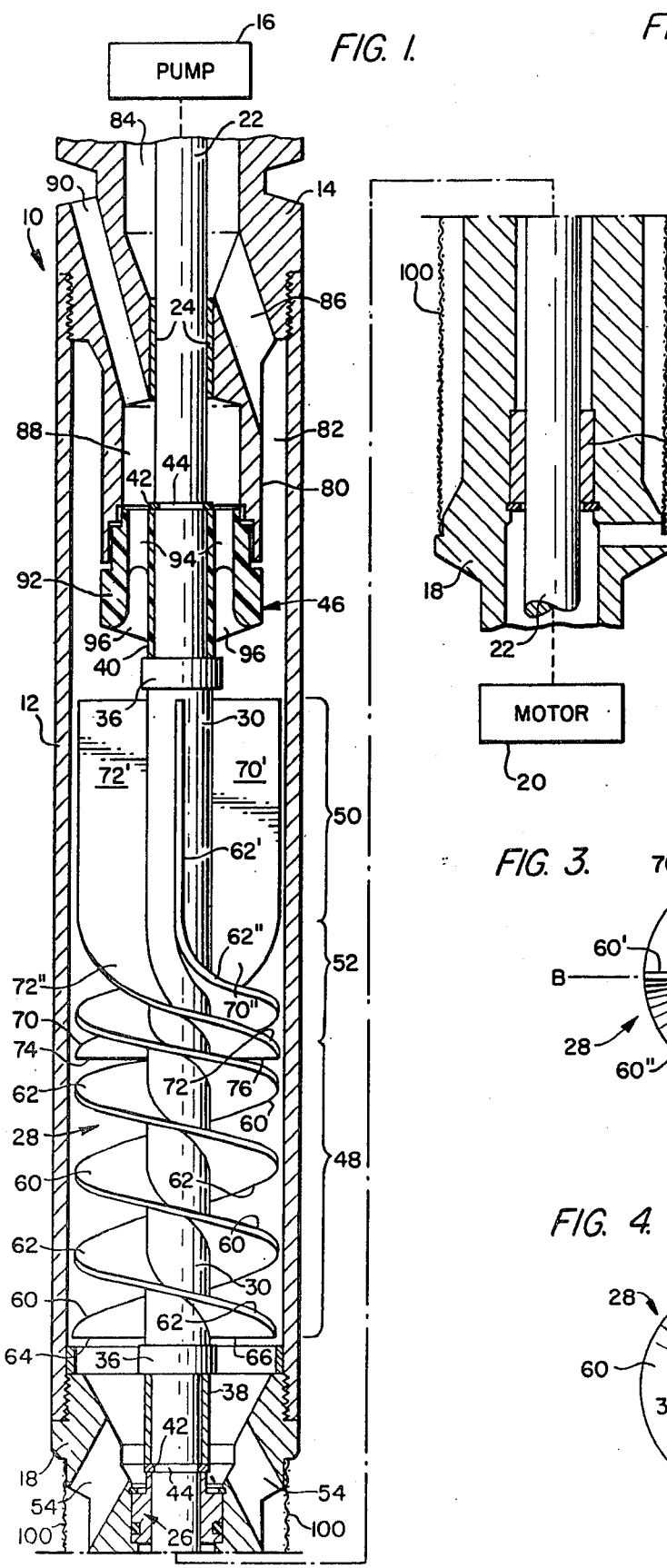
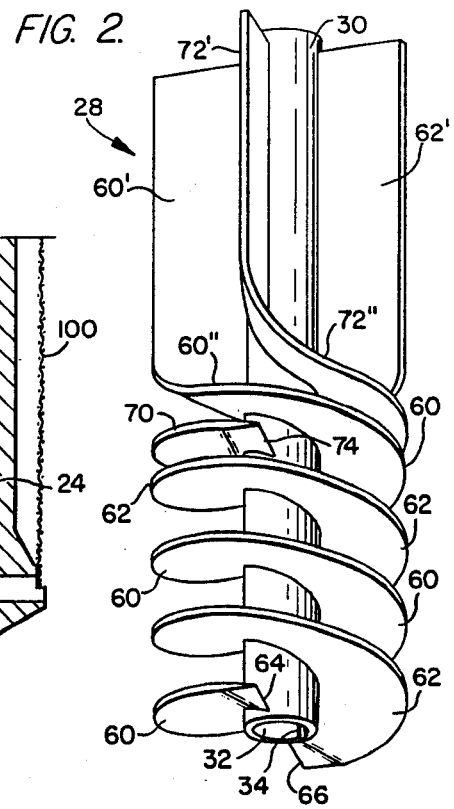
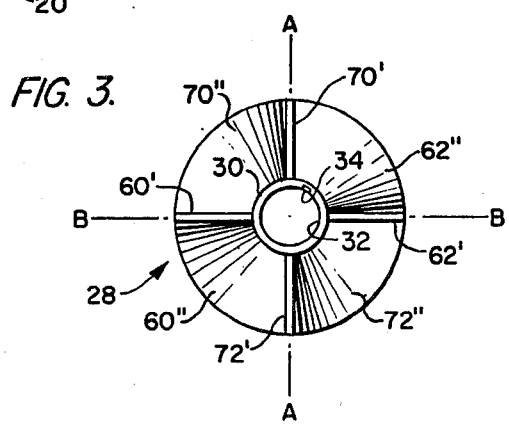
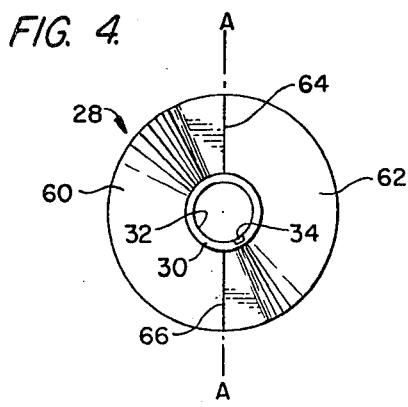

LIQUID-GAS SEPARATOR APPARATUS

This application is a continuation-in-part of prior application Ser. No. 276,201, filed June 22, 1981 now abandoned.

BACKGROUND OF THE INVENTION

This invention relates to fluid separator apparatus and more particularly to liquid-gas separators adapted for use with submergible downhole pumps.

Liquid-gas separators are used downhole in oil-producing wells to separate gas from crude oil before the oil enters the downhole pump. Any gas present in the oil supplied to the pump tends to restrict the flow through the pump and to reduce its volumetric efficiency. If excessive quantities of gas are present in the oil, gas lock can occur which completely restricts the flow of the oil through the pump, requiring that the pump be shut down for later restart. An effective liquid-gas separator reduces the possibility of gas lock and enables the pump to operate continuously and efficiently to pump more oil.

The prior art is replete with liquid-gas separators for downhole use. U.S. Pat. No. 3,887,342 to Bunnelle, issued June 3, 1975, and U.S. Pat. No. 4,088,459 to Tuzson, issued May 9, 1978 disclose centrifugal-type liquid-gas separators. U.S. Pat. No. 2,969,742 to Arutunoff, issued Jan. 31, 1961, and assigned to the same assignee as the present invention, discloses a reverse flow-type liquid-gas separator. U.S. Pat. No. 4,231,767 to Acker, issued Nov. 4, 1980, also assigned to the same assignee as the present invention, discloses a screen-type liquid-gas separator. Although known centrifugal-type separators may perform satisfactorily at low to moderate flow rates, they do not operate well at high flow rates, or with high volumetric ratios of gas to liquid, and they are unable to match the requirements of many high-capacity submergible pumps, resulting in the pump being "starved" and its output being reduced. Reverse flow-type separators also suffer from the same disadvantages. Screen-type separators may perform well at high flow rates. However, over a period of time, their screens tend to become clogged, which reduces their capacity and effectiveness.

It is desirable to provide liquid-gas separators which overcome these and other disadvantages of known separators, and it is to this end that the present invention is directed.

SUMMARY OF THE INVENTION

The present invention provides liquid-gas separators which are capable of operating at high flow rates and high volumetric ratios of gas to liquid, and which are exceptionally effective to separate the liquid and the gas components of a downhole well fluid. In addition, the separators are smaller, less complicated, and less expensive to produce than known separator apparatus, and they afford startling increases in oil well production. One reason for the remarkable performance of the separators is that not only are they capable of effectively separating substantially completely gas from the downhole well fluid, they are very effective in preventing gas breakout from the downhole fluid.

Briefly stated, in one aspect the invention provides liquid-gas separator apparatus comprising inducer means for pressurizing a liquid-gas fluid mixture entering the apparatus; centrifugal separator means for separating the liquid and gas components of the fluid mixture; and transition means disposed intermediate the inducer means and the centrifugal separator means for conveying the fluid mixture from the inducer means to the centrifugal separator means. The inducer means is formed to pressurize the fluid mixture sufficiently to provide a pressurized fluid flow through the apparatus and to maintain a positive liquid and gas exit pressure. The transition means is formed to convey the fluid mixture smoothly from the inducer means to the centrifugal separator means with minimum pressure loss.

In another aspect, liquid-gas separator apparatus in accordance with the invention may comprise an elongated hub having means for connecting the hub to a rotary shaft, helical blade means defining a screwtype inducer disposed on a first longitudinal portion of the hub for pressurizing a liquid-gas fluid mixture entering the apparatus, sufficiently to provide a pressurized fluid flow through the apparatus, vane means defining a centrifugal separator disposed on a second longitudinal portion of the hub for separating the liquid and gas components of the liquid-gas fluid mixture, and curved blade segment means disposed intermediate the blade means and the vane means and shaped to provide a smoothly curved transition for smooth fluid flow between the blade means and the vane means.

BRIEF DESCRIPTION OF THE DRAWINGS

FIG. 1 is a longitudinal sectional view illustrating a liquid-gas separator apparatus in accordance with a first embodiment of the invention;

FIG. 2 is a perspective view of an impeller of the apparatus of FIG. 1;

FIG. 3 is a top view of the impeller of FIG. 2;

FIG. 4 is a bottom view of the impeller of FIG. 2;

DETAILED DESCRIPTION OF THE PREFERRED EMBODIMENTS

Figure 5A:
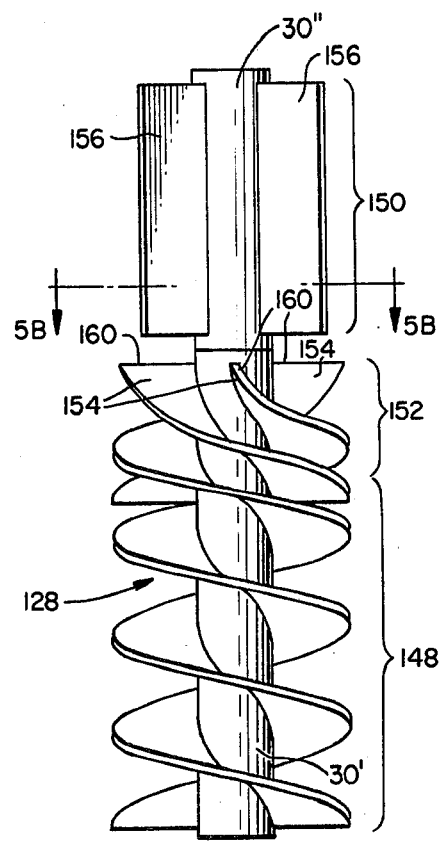
FIG. 5A is an elevation view of an impeller for liquid-gas separator apparatus in accordance with a second embodiment of the invention.

Liquid-gas separator apparatus in accordance with the invention is particularly well adapted for use with submergible downhole pumps in oil-producing wells, and will be described in that environment. However, as will become apparent, the principles of the invention are also applicable to liquid-gas separator apparatus for use in other environments.

FIG. 1 illustrates a preferred form of a liquid-gas separator apparatus 10 in accordance with a first embodiment of the invention. The apparatus comprises a tubular (preferably cylindrical) housing 12 adapted to extend longitudinally within and spaced from a well casing (not illustrated). The upper end of the housing may be threaded onto a discharge head 14, which may be connected to the housing of a submergible pump 16 (illustrated diagrammatically), and the lower end of the housing may be threaded onto an intake head 18, which may be connected to the housing of an electric motor 20 (also illustrated diagrammatically). Pump 16 and motor 20 may be a conventional submergible centrifugal pump and drive motor adapted for operation downhole in an oil well. A drive shaft 22 extends from the motor to the pump along the axis of the housing and through the intake head and the discharge head. Shaft 22 may be supported within the housing by sleeves 24 mounted in the discharge head and in the intake head, and by a seal and bearing assembly 26 mounted in the intake head.

The invention employs an impeller 28 (shown in more detail in FIGS. 2-4) located within the housing between the intake head 18 and the discharge head 14. Impeller 28 comprises an elongated tubular hub 30 having an axial bore 32 to enable the impeller to be mounted coaxially on shaft 22 for rotation therewith. The hub may be connected to the shaft by keys (not illustrated) received in a keyway 34 (see FIGS. 2-4) within bore 32 and a corresponding keyway (not illustrated) in the shaft. As shown in FIG. 1, the hub may be located axially on the shaft by bushings 36 at opposite ends of the hub and by sleeves 38, 40 mounted on the shaft by snap rings 42 received in circumferential grooves 44 in the shaft. Sleeve 40, at the upper end of the hub, may be part of a flow divider 46, to be described hereinafter.

As shown in FIGS. 1 and 2, and as will be described in more detail hereinafter, disposed longitudinally on the periphery of hub 30 are vanes and blades having different shapes. The vanes and blades are shaped to perform different functions, and they divide the impeller into three distinct regions or stages which cooperate to separate effectively and substantially completely the liquid and gas components of the fluid mixture entering intake (inlet) ports 54 of intake head 18. The lower region of the impeller comprises a screw-type inducer 48; the upper region of the impeller comprises a centrifugal separator 50; and the intermediate region between the inducer and the centrifugal separator comprises a transition region 52. The inducer pressurizes the liquid-gas fluid mixture entering intake ports 54 sufficiently to provide a pressurized fluid flow through the transition region and the centrifugal separator region of the apparatus. Preferably, the inducer develops sufficient pressure to enable a positive pressure to be maintained at the pump intake at all operating flow rates, thereby "force feeding" the pump, and to enable the separated gas to be expelled from the apparatus at a rate sufficient to provide a flow rate capability through the separator apparatus that is greater than the flow rate of the pump. The centrifugal separator 50 communicates with the inducer via transition region 52 and imparts rotary or circular motion to the fluid mixture to separate the liquid and gas components thereof through centrifuge action. The transition region 52 provides a smooth transition between the inducer and the centrifugal separator and is shaped to convey the fluid mixture from the inducer to the centrifugal separator with minimum pressure loss.

As shown in FIGS. 1 and 2, inducer 48 of impeller 28 comprises a pair of helical blades 60, 62 disposed symmetrically about the lower portion of hub 30 to define a double helix screw-type inducer. Each blade has a radially extending leading edge 64, 66, respectively, located near the lower end of the hub adjacent to the intake head. As shown in FIG. 2, blades 60, 62 are preferably tapered (circumferentially) toward their leading edges so that the leading edges are sharp. This minimizes turbulence in the fluid mixture entering the inducer. As shown in FIG. 4, leading edges 64, 66 are symmetrically disposed 180° apart on opposite sides of hub 30 and may lie in an axially extending plane indicated by the line A—A.

From their respective leading edges, blades 60, 62 extend helically upwardly about hub 30 for a predetermined axial distance. As shown in FIGS. 1 and 2, this distance may be approximately equal to one-third of the length of the hub, and each blade may make approximately two complete revolutions (720 degrees) about the hub with a rather small blade angle, $\beta$, with respect to a plane normal the hub axis. The blade angle $\beta$, varies as a function of radius r from the hub axis in accordance with the equation:

$$\tan \beta = p/2\pi r \tag{1}$$

where p=pitch, i.e., the axial distance required for the blades to traverse an angle, $\theta$, of 360° about the hub. For a given radius, the blade angle of each blade 60, 62 is preferably constant as the blade extends helically upwardly about the hub to define a constant pitch screw inducer.

The blade angle at the outer radius or tip of the inducer blades is preferably of the order of 5° to 15°. This enables the fluid mixture entering the inducer to be pressurized gradually. The flow rate through the inducer is a function of blade angle, and lower blade angles correspond to lower fluid velocities and to higher static pressures. For very high gas content fluid mixtures it is preferable to employ blade angles near the lower end of this range, i.e., of the order of 5°, to provide higher static pressures to prevent gas breakout from the fluid mixture and the possibility of gas lock. Since the flow rate through the separator apparatus is a function of the blade angle and the length of the inducer, and since it is desirable to maintain a rather small blade angle in the inducer, the length of the inducer may be selected appropriately to provide the desired output flow rate and pressure. Preferably, the length of the inducer is selected to provide at least a 0.1 second dwell time for the fluid flowing therethrough at the desired flow rate.

In a preferred form, the inducer may have a diameter of the order of 3.4 inches, a length of the order of 4 inches, a pitch of 2 inches, a blade angle at the tip of the blades of approximately 10.6°, and a blade angle at the inner radius of the blades (at the hub) of approximately 29.6°. Such dimensions afford a flow rate capability of approximately 80 gallons per minute at 3500 RPM.

From the inducer, blades 60, 62 are continued into the transition region 52 as blade segments 60", 62", respectively. The blade segments curve smoothly upwardly from the low blade angle of the inducer to a blade angle of 90°, i.e., vertical, in a circumferential distance of approximately 90° (one quarter turn about the hub). The blades then extend vertically upwardly for approximately the remaining length of the hub (in the centrifugal separator region) forming substantially straight radially directed axially extending vanes 60', 62', respectively. The blade segments 60", 62" provide a continuous smoothly curved transition between inducer blades 60, 62 and their corresponding axial vanes 60', 62', respectively, to change the flow direction of the fluid mixture leaving the inducer so that it enters the centrifugal separator region with a substantially vertical flow direction, i.e., parallel to the centrifugal separator vanes. The blade segments are designed to convey the fluid mixture from the inducer to the centrifugal separator without abrupt change in either flow direction or velocity and with minimum pressure loss. Preferably, the blade segments are as short as possible (thereby reducing pressure losses due to friction) and are shaped to minimize the rate of change in fluid velocity and direction. Employing a blade angle for the blade segments which varies as a linear function along the blade segment length, i.e., with flow distance, results in a uniform rate of change in velocity and direction throughout the transition region and accomplishes the desired result. Preferably, the blade angle in the transition region satisfies the following equation:

$$\cos \beta = \cos \beta_o - Z/r(1 - \sin \beta_o)/\theta_o \qquad (2)$$

where for a given radius, r, $\beta$=blade angle, $\beta_o$=blade angle at the inlet to the transition region (which is equal to the inducer blade angle at radius r), Z=axial length, and $\theta_o$=the azimuthal angle about the hub wrapped by one blade segment from the transition region inlet to the transition region outlet.

In a preferred form, $\theta_o$ equals aproximately 90° (one-quarter turn about the hub). Within this angular distance, the blade segments in the transition region uniformly change the fluid flow direction (and velocity) continuously from an inducer region blade angle of approximately 10.6° at the blade tip (for an impeller having the previously given parameters) to an angle of 90° at the inlet to the centrifugal separator region, the blade angle (and flow direction) at any point within the transition region being given by Equation 2. Designing the transition region in this manner minimizes pressure loss in the fluid mixture flowing through the transition region which is important for preventing gas breakout. At the exit of the transition region, the tangential velocity of the fluid mixture approaches the angular velocity of the centrifugal separator vanes, thereby minimizing disturbance of the fluid mixture as it flows into the centrifugal separator, and the axial velocity of the fluid mixture approaches the flow-through velocity of the apparatus. (It should be noted that fluid transition regions, in pumps for example, are conventionally designed to provide a change in fluid velocity which is a linear function of projected distance, rather than designed to provide a change in blade angle which is a linear function of flow distance, as in the invention. Designing transition region 52 in a conventional manner would result in an abrupt change in blade angle, which would produce undesirable losses.)

As best shown in FIG. 3, vanes 60', 62' in centrifugal separator region 50 are preferably symmetrically disposed 180° apart on opposite sides of hub 30, and preferably lie in an axially extending plane indicated by the line B—B which is normal to axial plane A—A. Accordingly, in the impeller illustrated in FIGS. 1-4, each inducer blade and its associated transition region blade segment and centrifugal separator region vane 60-60"-60', 62-62"-62', constitutes one continuous blade which traverses an angle of approximately 810° between the inducer inlet and the centrifugal separator outlet (720° in the inducer region and 90° in the transition region). However, as will be described shortly, the blades and vanes need not be formed as one continuous blade.

As shown in FIGS. 1-4, the blades, the blade segments, and the vanes preferably all have the same radial dimension, i.e., diameter, and extend to slightly less than the inner surface of tubular housing 12. For complete separation of the liquid and gas components of the fluid mixture, the length of the centrifugal separator region is preferably selected to provide a dwell time for the fluid mixture within the centrifugal separator region of at least 0.1 seconds. For an impeller diameter of 3.4 inches (as previously described), the centrifugal separator may have a length of the order of 3.75 inches, and the corresponding transition region length may be of the order of 3.25 inches.

As shown in FIGS. 1 and 2, the centrifugal separator 50 may be formed with another pair of axially extending vanes 70', 72', symmetrically disposed 180° apart on opposite sides of hub 30 and positioned at right angles to vanes 60', 62'. As shown in FIG. 3, vanes 70', 72' are preferably located in axial plane A—A. Each vane 70', 72' may be connected to an associated inducer blade 70, 72, respectively, by an assocismoothly curved blade segment 70", 72", respectively, in transition region 52. Blade segments 70", 72" preferably have the same shape and blade angles as blade segments 60", 62", and they function in the same manner to provide a smooth fluid transition between blades 70, 72 and their associated vanes 70', 72'.

Unlike blades 60, 62, however blades 70, 72 do not extend to the lower end of hub 30. Rather, as shown in FIGS. 1 and 2, blades 70, 72 terminate in sharp tapered leading edges 74, 76, respectively, within the inducer region 48 just below the transition region 52. As best illustrated in FIG. 1, each associated blade, blade segment and vane 70-70"-70', 72-72"-72' may be continuous and may traverse approximately 180° (one half turn) about hub 30 so that leading edges 74, 76 lie in axial plane A—A. Each blade segment 70", 72" may traverse approximately one-quarter turn about the hub and its associated blade 70, 72 may traverse another one-quarter turn. As is also shown in FIGS. 1 and 2, leading edges 74, 76 of blades 70, 72, respectively, are located axially between adjacent blades 60, 62, and blade segments 70", 72" are located axially midway between adjacent blade segments 60", 62". Blades 70, 72 and blade segments 70", 72" divide the fluid mixture flowing between inducer blades 60, 62 and between transition region blade segments 60", 62" into different paths and distribute the fluid mixture more evenly to the centrifugal separator.

The sharp tapered leading edges 74, 76 of blades 70, 72, respectively, function in the same manner as the sharp tapered leading edges 64, 66 of blades 60, 62, respectively to reduce turbulence in the fluid mixture, which minimizes the possibility of gas breakout and provides a smoother fluid flow between the blades. The transition region blade segments 70", 72", and centrifugal separator vanes 70', 72' also serve to prevent local recirculation of the fluid mixture and the consequent pressure drop which could allow gas breakout from the fluid mixture and possibly gas lock. Blades 70, 72 do not extend to the lower end of hub 30 since this could unduly restrict the intake flow-through area of the inducer. If the flow-through area is too small, the flow passage could be blocked by gas build-up in a high gas content fluid. For this reason, it is desirable that the inducer be formed with only two intake blades. For applications in other than downhole environments where larger diameter, e.g., 5 inches or more, impellers are employed, the number of inducer blades, as well as the number of centrifugal separator vanes and associated transition region blade segments, may be increased. For downhole applications, however, diameters of less than 5 inches are typical, and it is preferable to use only two inducer intake blades and only four transition region blade segments. Four centrifugal separator vanes are sufficient for good separation, although more than four vanes may be used. However, more than four vanes does not improve performance appreciably (for downhole applications).

Figure 5B:
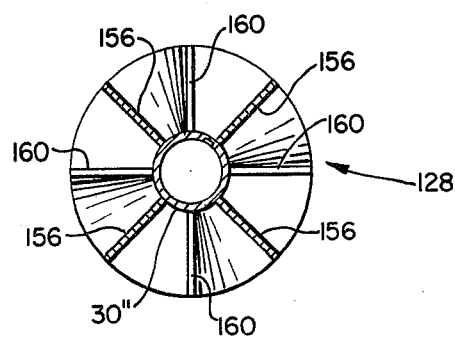
FIG. 5B is a sectional view taken along the line 5B—5B of FIG. 5A.

FIGS. 5A and 5B illustrate an impeller 128 in accordance with a second embodiment of the invention. Impeller 128 may comprise an inducer 148, a transition region 152, and a centrifugal separator 150, and may be generally similar to impeller 28, except that the transition region blade segments 154 and the vanes 156 in the centrifugal separator region are not continuous. Rather, as best shown in FIG. 5A, centrifugal separator vanes 156 may be spaced axially from the upper radial edges 160 of the transition region blade segments and, as best shown in FIG. 5B, they may be rotated circumferentially with respect thereto so that the vanes are located approximately midway between the radial edges of adjacent blade segments. In the form illustrated in FIGS. 5A and 5B, the transition region blade segments do not attain a blade angle of 90° (at their tip) at the exit of the transition region, although preferably they reach a blade angle of the order of 80 degrees. The spacing between the upper radial edges of the blade segments and the lower edges of the centrifugal separator vanes is preferably selected to be at least equal to the axial distance that would be required for the blade segments to reach a blade angle of 90° if they were extended with the same curvature. This distance may be of the order of one-half to one inch. If the blade segments are carried to a tip blade angle of 90°, the spacing between the transition region and the centrifugal separator may be eliminated.

Impeller 128 may, if desired, be formed in two separate pieces, the blades of inducer 148 and blade segments of transition region 152 being located on a first hub 30' and constituting a first part of the impeller, and vanes 156 of centrifugal separator 150 being located on another hub 30" and constituting the second part of the impeller. For some applications, a two-piece impeller may offer some advantages, e.g., in construction, over a single-piece impeller such as impeller 28. Of course, impeller 28 could also be formed in two (or more) parts which are fitted together to form the structure illustrated in FIGS. 1-4.

Returning to FIG. 1, centrifugal separator 50 of impeller 28 acts as a centrifuge to separate the liquid and gas components of the fluid mixture. Because the liquid has a greater density than the gas, the liquid is centrifuged away from shaft 22 due to the rotary motion imparted to the fluid mixture by the vanes of the centrifugal separator, while the lower density gas tends to conform itself to the region about the shaft. As shown, discharge head 14 may be formed with a depending cylindrical tubular portion 80 positioned above flow divider 46. The outer surface of the cylindrical portion 80 cooperates with the inner surface of housing 12 to form an annular flow channel 82 for separated liquid that is connected to an upper chamber 84 in the discharge head, which communicates with the pump intake by a plurality of upwardly angled passageways (outlets) 86 symmetrically disposed about the discharge head (only one such passageway being illustrated in FIG. 1). Discharge head 14 may also have a lower chamber 88 formed about shaft 22 by the cylindrical portion 80 for receiving the gas, and may have a plurality of gas vents (outlets) 90 symmetrically disposed about the discharge head (only one such gas vent being illustrated in FIG. 1) which communicate with chamber 88. Flow divider 46, which in the form illustrated in FIG. 1 comprises a spider assembly connected to shaft 22 for rotation therewith, aids in directing the separated liquid into the annular flow channel 82 and in directing the separated gas into chamber 88. As shown, flow divider 46 may comprise an inner sleeve 40 having a bore through which shaft 22 passes, and an outer concentric cylindrical member 92 connected to sleeve 40 by spoke-like members 94. The opening 96 between cylindrical member 92 and sleeve 40 provide passageways to chamber 88 for the gas, and the inner surface of the lower end of cylindrical member 92 may be curved, as shown, to aid in collecting the gas leaving the centrifugal separator. The flow divider may be spaced slightly above the centrifugal separator, as opposed to being formed on the centrifugal separator itself, to provide a settling time for the fluids leaving the centrifugal separator. This enables smoother flow and better separation of the liquid and the gas. Although, in the form shown, the flow divider is a separate member which is connected to the shaft 22 and which rotates with the shaft, if desired, the lower end of discharge head 14 may be configured to perform flow division.

In operation, pump 16, separator apparatus 10, and motor 20 are submerged downhole within a liquid-gas well fluid mixture. The liquid-gas mixture enters the intake ports 54 of intake head 18 through a perforated or slotted member 100 which assists in filtering debris from the fluid mixture. From the intake ports, the fluid mixture enters inducer 48 which pressurizes the fluid mixture and supplies it to the centrifugal separator 50 via transition region 52. The transition region, which is designed to provide a uniform rate of change in flow direction and velocity to the fluid mixture, conveys the fluid mixture smoothly to the centrifugal separator while minimizing pressure loss. At the outlet of the transition region, the tangential velocity of the fluid mixture approaches the angular velocity of the centrifugal separator vanes, and the axial velocity of the fluid approaches the flow-through velocity of the apparatus. Liquid-gas separation occurs at the inlet of the centrifugal separator region and continues throughout its length. At the outlet of the centrifugal separator region, there is substantially complete separation of the liquid and gas components of the fluid mixture. The liquid component of the mixture is supplied to the pump intake as previously described, while the separated gas is vented via gas vents 90 into the space between the well casing (not illustrated) and the outer surfaces of the housings of the discharge head and pump.

As noted earlier, the inducer is designed to have a flow rate capability greater than that of the pump, and to develop a pressure increase sufficient to provide a pressurized fluid flow through the transition and centrifugal separator regions and to maintain a positive pressure at the pump intake so that the pump is force fed by the inducer. Furthermore, the pressure developed by the inducer is preferably sufficiently greater than the well bore pressure (at gas vents 90) to enable separated gas to be expelled at a rate that is fast enough to enable operation at desired flow rates with high volumetric ratios of gas to liquid.

The pressurization of the fluid mixture provided by inducer 48 of the invention has been found to be important for preventing gas breakout in the transition and centrifugal separator regions of the apparatus, and is an important factor contributing to the remarkable performance (which will be described shortly) of the invention. Other important factors contributing to the remarkable performance of the invention include the low blade angle of the screw inducer which enables gradual pressurization of the fluid mixture entering the inducer, the sharp tapered leading edges of the inducer blades which minimize turbulence in the fluid mixture entering the inducer, thereby minimizing gas breakout and providing a smoother flow through the inducer, and the smoothly curved transition region between the inducer and the centrifugal separator which contributes to a smooth fluid flow through the apparatus without abrupt changes in flow direction while minimizing undesirable losses.

Figure 6:
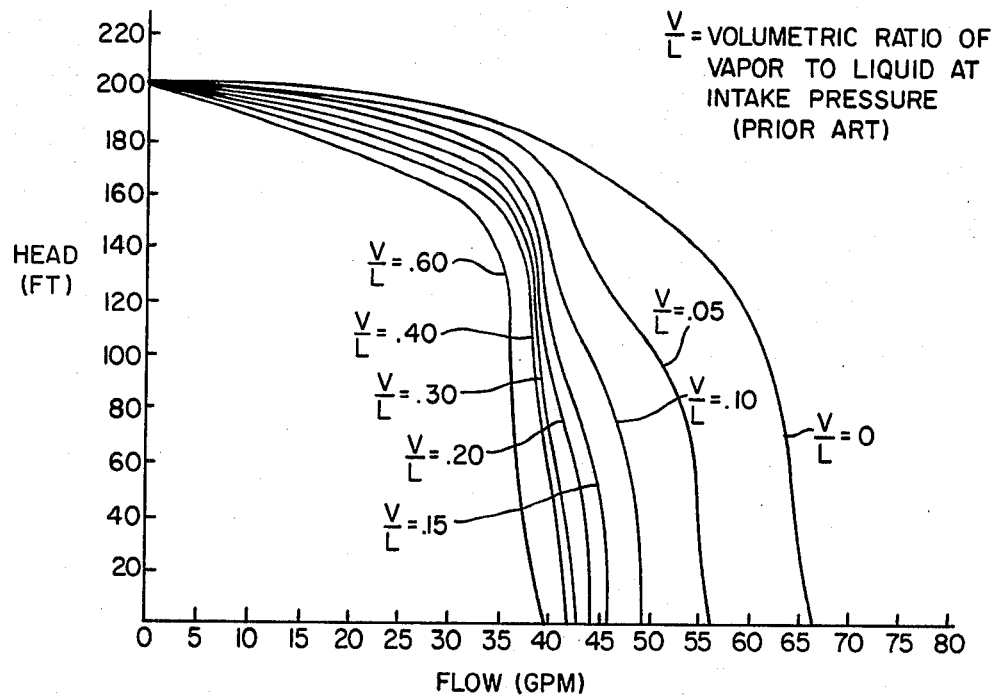
FIGS. 6 and 7 are diagrams illustrating the operation of known centrifugal-type separators at different volumetric ratios.
Figure 7:
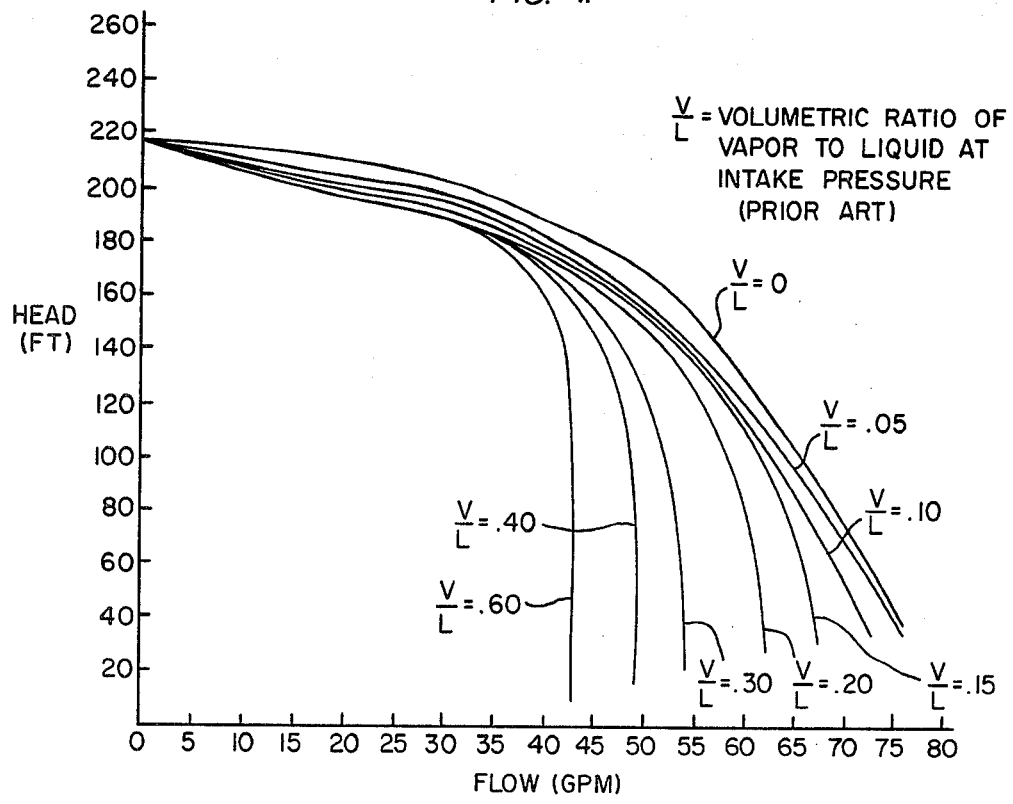
Figure 8:
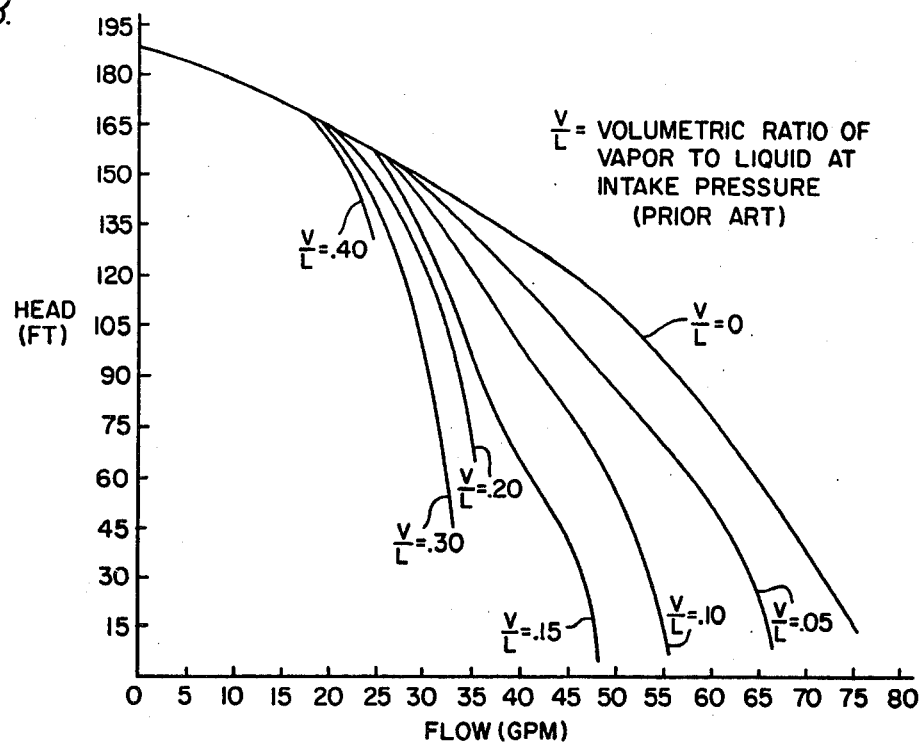
FIG. 8 is a diagram illustrating the operation of a known reverse flow-type separator at different volumetric ratios.
Figure 9:
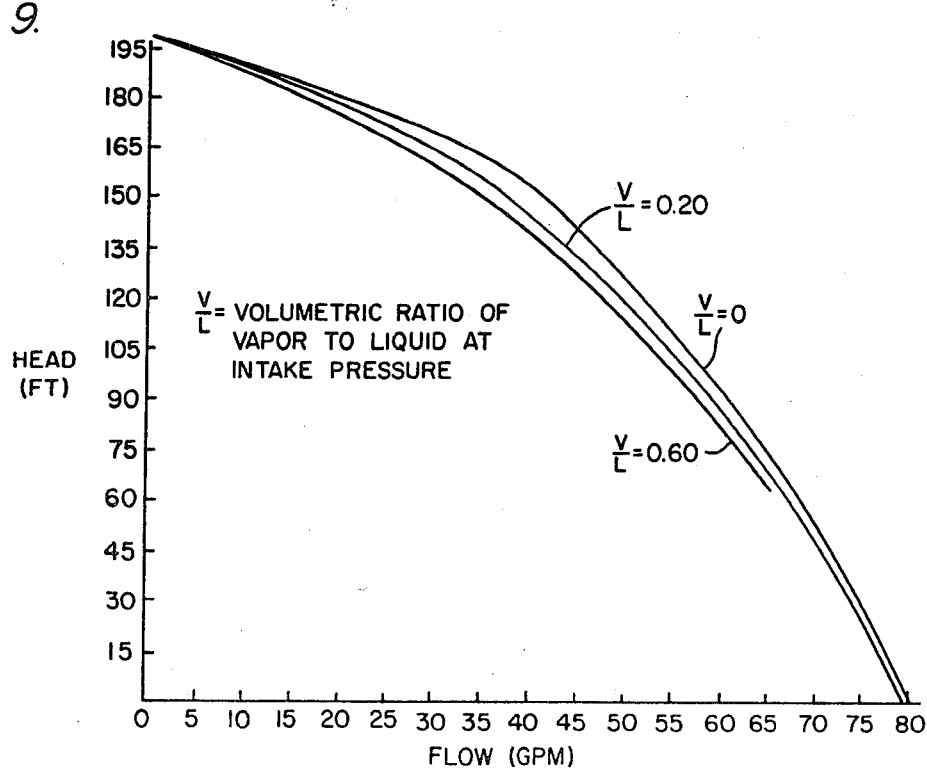
FIG. 9 is a diagram illustrating the operation of a liquid-gas separator in accordance with the invention at different volumetric ratios.

FIGS. 6-9 contrast the performance of a liquid-gas separator apparatus in accordance with the invention (FIG. 9) with the performance of the centrifugal liquid-gas separators of the previously cited U.S. Pat. Nos. 3,887,342 (shown in FIG. 6) and 4,088,459 (shown in FIG. 7) and with the performance of a conventional reverse flow liquid-gas separator (FIG. 8). The curves illustrate the flow rate performance at different pressures and for different volumetric ratios of gas to liquid. The curves of FIGS. 6-9 were derived from actual laboratory tests. As shown in FIGS. 6-8, the flow rate through the known separators decreases dramatically as the volumetric ratio of vapor (gas) to liquid increases. In contrast, the curves of FIG. 9 for liquid-gas separator apparatus in accordance with the invention show that the flow rate through the separator apparatus of the invention changes very little with changes in volumetric ratio, and that even with a rather large volumetric ratio $V/L=0.60$, the flow rate is not substantially different from the flow rate at $V/L=0$. The curves of FIG. 9 demonstrate that liquid-gas separator apparatus in accordance with the invention is able to maintain a relatively constant flow rate over widely varying volumetric ratios, thereby ensuring that the submergible pump operates at close to its maximum efficiency. The remarkable performance of liquid-gas separator apparatus in accordance with the invention was also confirmed by actual field testing which showed that the invention affords a startling increase in oil well production over that afforded by conventional liquid-gas separators. Moreover, the invention achieves such improved results with a rather simple and inexpensive construction.

While preferred embodiments of the invention have been shown and described, it will be apparent to those skilled in the art that changes can be made in these embodiments without departing from the principles and spirit of the invention, the scope of which is defined in the appended claims.

We claim:

1. Liquid-gas separator apparatus comprising a housing having an inlet for a liquid-gas fluid mixture and having first and second outlets for separated liquid and gas, respectively, helical blade means defining screw inducer means in the housing for pressurizing a liquid-gas fluid mixture entering the housing through the inlet, elongated vane means defining centrifugal separator means in the housing for separating liquid and gas components of the fluid mixture, blade segment means defining transition means disposed in the housing intermediate the screw inducer means and the centrifugal separator means for conveying the fluid mixture smoothly from the screw inducer means to the centrifugal separator means while minimizing pressure loss, and means for separately conveying separated liquid and gas components of the fluid mixture to said first and second outlets, respectively, the blade segment means of the transition means being formed and related to the helical blade means of the screw inducer means and to the vane means of the centrifugal separator means so as to define a transition flow path that is free of abrupt changes in flow direction and that smoothly and continuously changes the direction of flow of the fluid mixture from the helical blade means of the screw inducer means to a direction of flow substantially along the length of the vane means of the centrifugal separator means, the helical blade means of the screw inducer means being formed to pressurize the fluid mixture sufficiently to provide a pressurized fluid flow through the housing and to maintain positive liquid and gas exit pressures at said first and second outlets, respectively.

2. The apparatus of claim 1, wherein the transition means is formed to provide a uniform rate of change in flow direction and velocity to the fluid mixture.

3. The apparatus of claim 1, wherein the transition means includes means for preventing local recirculation of the fluid mixture flowing from the inducer means to the centrifugal separator means.

4. The apparatus of claim 1, wherein the inducer means is formed to gradually pressurize the fluid mixture entering the apparatus.

5. The apparatus of claim 1, wherein the inducer means and the transition means are formed to prevent gas breakout from the fluid mixture.

6. The apparatus of claim 1, wherein the helical blade means of the inducer means comprises helical blades disposed on a first longitudinal portion of a rotary hub.

7. The apparatus of claim 6, wherein the screw inducer means has a length sufficient to provide at least a 0.1 second dwell time to the fluid mixture flowing therethrough.

8. The apparatus of claim 6, wherein the blades have sharp leading edges to minimize turbulence in the fluid mixture entering the screw inducer means.

9. The apparatus of claim 6, wherein the blades have a predetermined blade tip angle with respect to a plane normal to the axis of the hub in the range of 5° to 15°.

10. The apparatus of claim 9, wherein said blade angle is substantially constant for the length of the screw inducer means.

11. The apparatus of claim 6, wherein the blade segment means of the transition means comprises curved blade segments disposed on a second longitudinal portion of the hub, each blade segment being connected to an associated blade.

12. The apparatus of claim 11, wherein the blade segments have a blade angle which varies as a linear function of blade segment length.

13. The apparatus of claim 11, wherein the vane means of the centrifugal separator means comprises longitudinally extending vanes disposed on a third longitudinal portion of the hub, and wherein said curved blade segments are formed to convey the fluid mixture to the centrifugal separator means with a flow direction substantially parallel to the vanes.

14. The apparatus of claim 13, wherein said vanes have a length sufficient to afford a fluid dwell time in the centrifugal separator means of at least 0.1 second.

15. The apparatus of claim 13, wherein each vane is connected to a corresponding blade segment such that each associated blade, blade segment and vane comprises a single structure.

16. The apparatus of claim 13, wherein each blade segment has a radial edge adjacent to the centrifugal separator means, and each vane has a radial edge, the circumferential position of which is located between the circumferential positions of the radial edges of adjacent blade segments.

17. The apparatus of claim 16, wherein the radial edges of the vanes are spaced axially from the radial edges of the blade segments.

18. Liquid-gas separator apparatus comprising a housing having an inlet for a liquid-gas fluid mixture and having first and second outlets for separated liquid and gas, respectively, an elongated hub in the housing adapted for connection to a rotary shaft, blade means defining a screw inducer disposed on a first longitudinal portion of the hub for pressurizing a liquid-gas mixture entering the housing through the inlet sufficiently to provide a pressurized fluid flow through the housing, elongated vane means defining a centrifugal separator disposed on a second longitudinal portion of the hub for separating liquid and gas components of the fluid mixture, curved blade segment means disposed intermediate the blade means and the vane means, the curved blade segment means being shaped so as to define a transition flow path that is free of abrupt changes in flow direction and that smoothly and continuously changes the direction of flow of the fluid mixture from the blade means of the screw inducer to a direction of flow substantially along the length of the vane means of the centrifugal separator, and means for separately conveying separated liquid and gas components of the fluid mixture to said first and second outlets, respectively.

19. The apparatus of claim 18, wherein the blade means comprises a pair of blades extending helically about the hub from an end region thereof, and wherein the blade segment means comprises a pair of curved blade segments, each blade segment being connected to an associated blade so as to form a continuous blade structure.

20. The apparatus of claim 19, wherein the vane means comprises a pair of substantially straight radial vanes extending axially from another end region of the hub towards the blade segments.

21. The apparatus of claim 20, wherein the blade segments are shaped to convey the liquid-gas mixture from the blades to the vanes with a flow direction substantially parallel to the vanes.

22. The apparatus of claim 21, wherein the blade segments are shaped to provide a uniform rate of change in flow direction and velocity to the liquid-gas mixture.

23. The apparatus of claim 22, wherein the blade segments have a blade tip angle with respect to a plane normal to the axis of the hub that varies as a linear function of blade segment length.

24. The apparatus of claim 19, wherein each blade makes approximately two revolutions about the hub with a substantially constant blade tip angle with respect to a plane normal to the axis of the hub in the range of 5° to 15°.

25. The apparatus of claim 24, wherein each blade has a sharp leading radial edge located in the end region in order to minimize turbulence in the liquid-gas mixture entering the screw inducer.

26. The apparatus of claim 20, wherein the blade segment means comprises another pair of curved blade segments symmetrically disposed on the hub between the blade segments of the first-mentioned pair, and wherein the blade means comprises another pair of blades symmetrically disposed about the hub between the blades of the first-mentioned pair, each blade of said other pair being connected to an associated one of the blade segments of said other pair.

27. The apparatus of claim 26, wherein each blade of said other pair makes approximately one-quarter revolution about the hub and has a sharp leading edge located axially approximately midway between the blades of the first-mentioned pair.

28. The apparatus of claim 26, wherein the blades and the blade segments of said other pairs divide the liquid-gas mixture flowing between the blades and the blade segments of the first-mentioned pairs into different flow paths to distribute the liquid-gas mixture evenly between the vanes of the centrifugal separator.

29. The apparatus of claim 26, wherein the vane means comprises another pair of vanes disposed on the second longitudinal portion of the hub symmetrically with respect to the vanes of the first-mentioned pair.

30. The apparatus of claim 29, wherein each vane is connected to a corresponding blade segment such that each associated blade, blade segment and vane comprises a single structure.

31. Liquid-gas separator apparatus for use with a submergible pump connected to a motor by a shaft, comprising a housing having inlet means for a liquid-gas fluid mixture and having first and second outlet means for separated liquid and gas, respectively, the shaft passing longitudinally through the housing, helical blade means defining a screw inducer connected to the shaft within the housing adjacent to the inlet means for pressurizing the fluid mixture entering the housing sufficiently to provide a pressurized fluid flow through the housing, longitudinally extending vane means defining a centrifugal separator connected to the shaft for imparting rotary motion to the fluid mixture to separate the liquid and gas components thereof, blade segment means disposed intermediate the vane means and the blade means, the blade segment means being shaped so as to define a transition flow path that is free of abrupt changes in flow direction and that smoothly and continuously changes the direction of flow of the fluid mixture from the helical blade means of the screw inducer to a direction of flow substantially along the length of the vane means of the centrifugal separator, while minimizing pressure loss, and means for conveying the separated liquid and gas separately to their respective outlet means.

32. The apparatus of claim 31, wherein the screw inducer is formed to pressurize the fluid mixture sufficiently to provide positive liquid and gas exit pressures at said first and second outlet means.

33. The apparatus of claim 31, wherein the screw inducer is formed to provide a flow rate capability through the housing that is greater than the flow rate of the pump.

34. The apparatus of claim 31, wherein the blade means, the vane means, and the blade segment means are located on an elongated hub to form a unitary assembly that is coaxial with the shaft.

35. The apparatus of claim 31, wherein the blade means comprises a pair of helical blades symmetrically disposed about a first portion of the hub, the vane means comprises a pair of substantially straight axial vanes symmetrically disposed on a second portion of the hub, and the blade segment means comprises a pair of curved blade segments connecting each vane to an associated blade.

36. The apparatus of claim 35, wherein the vane means comprises another pair of substantially straight vanes symmetrically disposed on the second portion of the hub, and the blade segment means comprises another pair of curved blade segments connected to the vanes of said other pair.

37. The apparatus of claim 36, wherein the blade means comprises another pair of blades symmetrically disposed about the hub and connected to the blade segments of said other pair, said blades of the other pair having leading edges positioned axially between the blades of the first-mentioned pair and displaced axially from the leading edges of the blades of the first-mentioned pair.

38. The apparatus of claim 31, wherein the conveying means comprises a discharge head at one end of the housing, the discharge head defining a chamber adjacent to the shaft and an annular channel spaced radially from and circumferentially about said chamber, the first outlet means for liquid comprising openings connecting said channel with an intake of said pump, and the second outlet means for gas comprising a plurality of openings connecting said chamber with the exterior of the discharge head.

39. The apparatus of claim 38, wherein the conveying means comprises a flow divider connected to the shaft axially spaced from the centrifugal separator for directing the gas into the chamber and for directing the liquid into the annular channel.

* * * * *

UNITED STATES PATENT AND TRADEMARK OFFICE
CERTIFICATE OF CORRECTION

PATENT NO. : 4,481,020
DATED : Nov. 6, 1984
INVENTOR(S) : Lawrence C. LEE, et al It is certified that error appears in the above—identified patent and that said Letters Patent are hereby corrected as shown below:

On the title page:
Item [75], after "Lawrence C. Lee;" insert

-- Lee S. Kobylinski; --

Signed and Sealed this

Second Day of April 1985

[SEAL]

Attest:

DONALD J. QUIGG

Attesting Officer  Acting Commissioner of Patents and Trademarks